United States Patent
Okuda et al.

(10) Patent No.: US 12,107,458 B2
(45) Date of Patent: Oct. 1, 2024

(54) ROTATING ELECTRIC MACHINE AND METHOD FOR MANUFACTURING ROTATING ELECTRIC MACHINE

(71) Applicant: Mitsubishi Electric Corporation, Tokyo (JP)

(72) Inventors: Tatsuya Okuda, Tokyo (JP); Minoru Aoki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 388 days.

(21) Appl. No.: 17/607,557

(22) PCT Filed: May 14, 2019

(86) PCT No.: PCT/JP2019/019039
§ 371 (c)(1),
(2) Date: Oct. 29, 2021

(87) PCT Pub. No.: WO2020/230256
PCT Pub. Date: Nov. 19, 2020

(65) Prior Publication Data
US 2022/0209588 A1 Jun. 30, 2022

(51) Int. Cl.
*H02K 1/04* (2006.01)
*H02K 15/12* (2006.01)

(52) U.S. Cl.
CPC .............. *H02K 1/04* (2013.01); *H02K 15/12* (2013.01)

(58) Field of Classification Search
CPC ............ H02K 1/16; H02K 1/04; H02K 15/12; H02K 15/024
See application file for complete search history.

(56) References Cited

U.S. PATENT DOCUMENTS

| 2015/0288263 | A1* | 10/2015 | Aoki | H02K 15/10 |
| | | | | 264/261 |
| 2016/0329783 | A1* | 11/2016 | Nagai | H02K 15/02 |

FOREIGN PATENT DOCUMENTS

| JP | 2015149884 A | 8/2015 |
| JP | 5832695 B2 | 12/2015 |
| JP | 2016073109 A | 5/2016 |

OTHER PUBLICATIONS

Office Action dated May 11, 2023, issued in the corresponding Saudi Arabian Patent Application No. 521430598, 15 pages including 7 pages of English Translation.

(Continued)

*Primary Examiner* — Leda T Pham
(74) *Attorney, Agent, or Firm* — BUCHANAN INGERSOLL & ROONEY PC

(57) ABSTRACT

Stacked core sheets forming a stacked core of a rotating electric machine have tooth portions on the inner circumferential side. Axial-direction holes penetrating the stacked core in the axial direction are provided near the tooth bases and near the outer circumferential surface. Resin is injected through tooth base neighbor holes near the tooth bases and core outer circumferential holes near the outer circumferential surface of the stacked core, among the axial-direction holes in the rotating electric machine. Thus, the resin fills gaps near the tooth bases and near the outer circumferential surface of the stacked core, so that the stacked core sheets are bonded to each other, thus obtaining a rotating electric machine having such a stacked core.

9 Claims, 8 Drawing Sheets

(56) References Cited

OTHER PUBLICATIONS

International Search Report (PCT/ISA/210) with translation and Written Opinion (PCT/ISA/237) mailed on Aug. 6, 2019, by the Japan Patent Office as the International Searching Authority for International Application No. PCT/JP2019/019039. (9 pages).
Kuwait Examination Report dated Mar. 10, 2024, issued in the corresponding Kuwait Patent Application No. KW/P/2021/399, 4 pages.

* cited by examiner

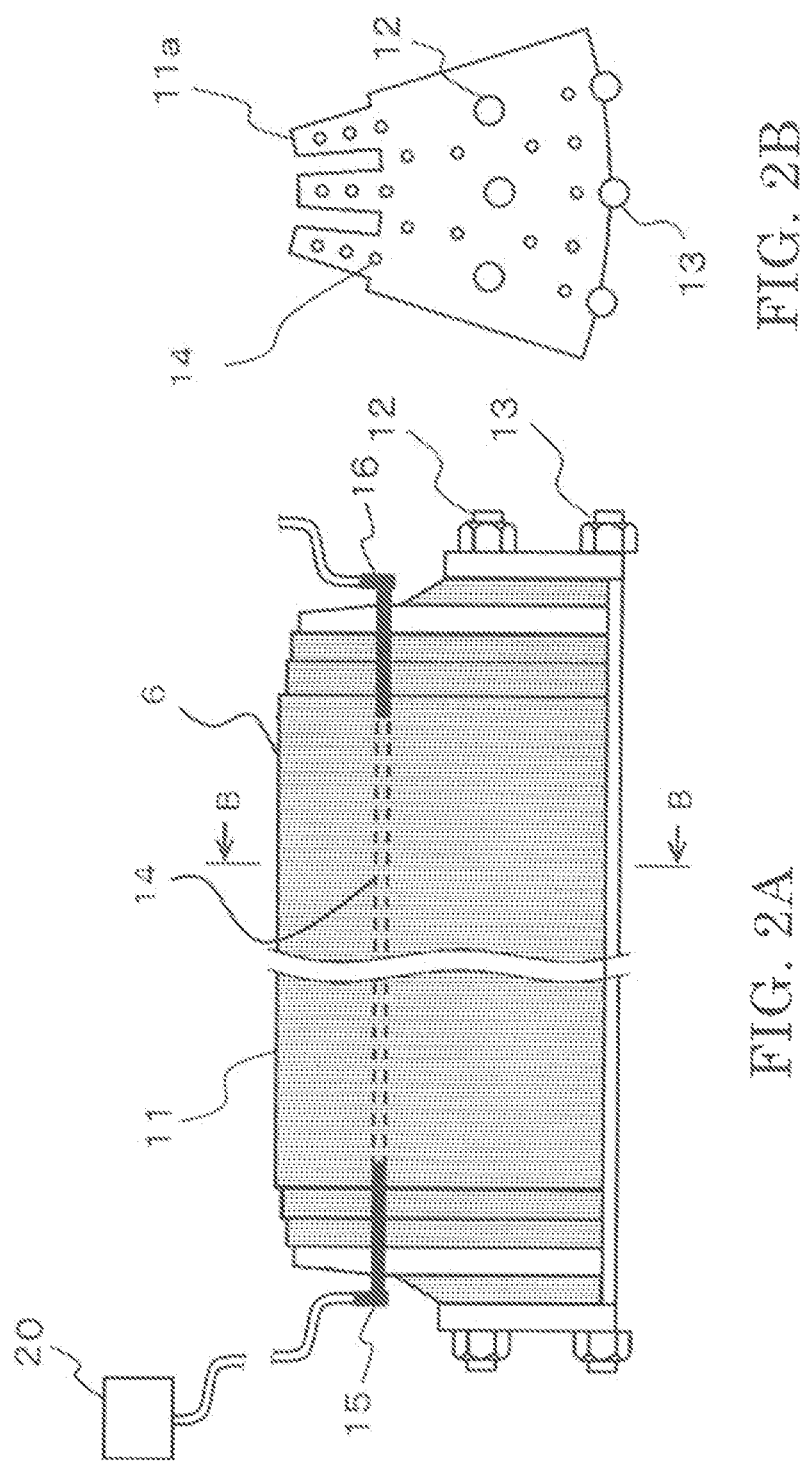

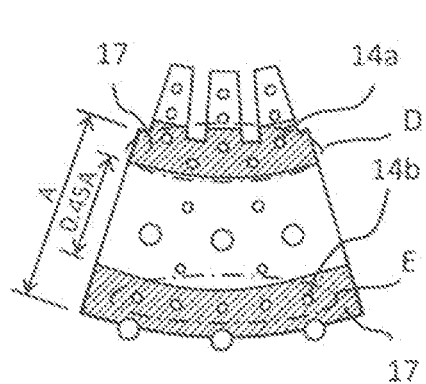
FIG. 5A
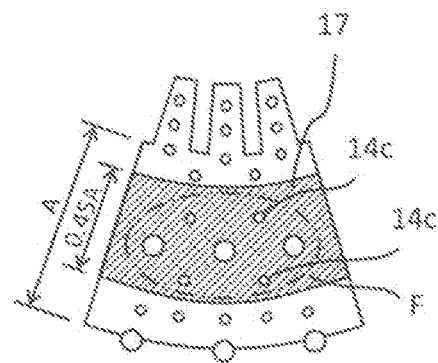
FIG. 5B
FIG. 6
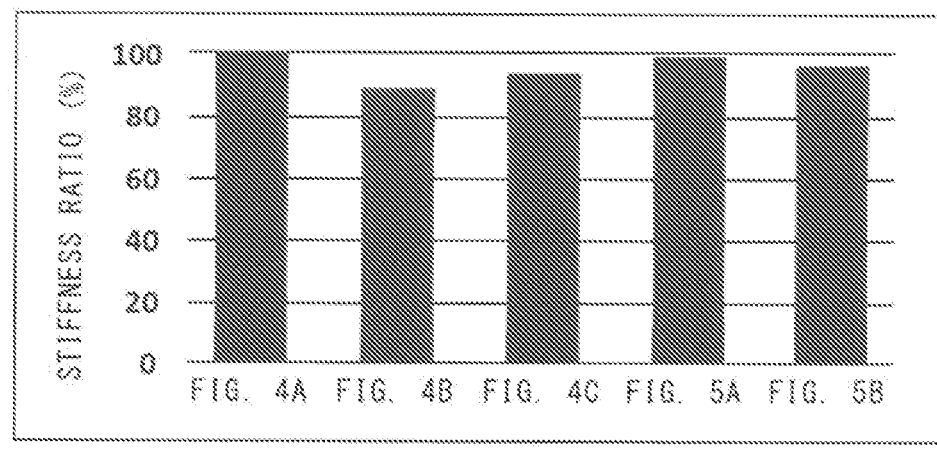

ROTATING ELECTRIC MACHINE AND METHOD FOR MANUFACTURING ROTATING ELECTRIC MACHINE

TECHNICAL FIELD

The present disclosure relates to a rotating electric machine and a method for manufacturing the rotating electric machine.

BACKGROUND ART

In general, a stator and a rotor of a rotating electric machine are formed of a stacked core. The stacked core is formed by stacking thin silicon steel sheets whose surfaces are coated with insulating varnish in order to reduce eddy current loss during operation of the rotating electric machine. This stacked core is fixed by being tightened with bolts or the like. As the size of the rotating electric machine increases and the stacked core becomes larger, minute gaps become more likely to be formed between the stacked layers. Presence of such minute gaps may cause adverse effects that the stiffness of the stacked core is reduced and vibration increases during operation of the rotating electric machine.

As means for filling the gaps between the layers of the stacked core, there is known a method in which the stacked core is immersed in resin contained in a tank so that the resin permeates into the gaps. This means is effective if the rotating electric machine is small. However, in a case of a large-size rotating electric machine such as a large-capacity electric generator, the size of a manufacturing apparatus therefor is large and a large-scale work is required, and thus there is a problem that it is difficult to directly apply the above method.

In order to solve this, a resin injection device and a resin injection method for a stacked core, and technology of providing a rotating electric machine using the resin injection method, are disclosed which enable resin to be easily injected into an assembled stacked core and thus can enhance the stiffness of the stacked core (see, for example, Patent Document 1).

CITATION LIST

Patent Document

Patent Document 1: Japanese Patent No. 5832695

SUMMARY OF THE INVENTION

Problems to be Solved by the Invention

The resin injection into the stacked core can be performed into axial-direction through holes provided in the core. The resin is injected into all the axial-direction holes present in the stacked core, whereby gaps formed between the stacked layers are minimized and thus the stiffness of the stacked core can be maximally increased. However, in a case where there are a countless number of axial-direction holes in the stacked core, a large-scale work is required for performing resin injection into all the axial-direction holes.

The present disclosure has been made to solve the above problem, and an object of the present disclosure is to provide a rotating electric machine and a manufacturing method therefor in which resin injection is performed for, among axial-direction holes provided in a stacked core, only necessary holes for ensuring the stiffness of the stacked core, thus enabling an efficient resin injection work and increasing the stiffness of the entire stacked core with a shorter work period as compared to the conventional art.

Solution to the Problems

A rotating electric machine according to the present disclosure is a rotating electric machine including a tubular stacked core formed by a plurality of element sheets stacked in an axial direction. The stacked core has a plurality of axial-direction holes formed in advance. A surrounding area around a resin injection hole selected from the plurality of axial-direction holes is filled with resin, so that the element sheets are bonded to each other. The resin injection hole is selected so that stiffness of the entire stacked core as a cylindrical structure is ensured at a same level as in a case of injecting the resin into all the axial-direction holes.

A rotating electric machine manufacturing method according to the present disclosure is a rotating electric machine manufacturing method in which resin is injected through a plurality of axial-direction holes provided in a tubular stacked core of a rotating electric machine into a gap between a plurality of element sheets forming the stacked core, so as to bond the plurality of element sheets to each other, thereby manufacturing the stacked core. From outside of the rotating electric machine, the resin is supplied by a pump to be injected from one end of a resin injection hole selected from the plurality of axial-direction holes, so as to fill the gap between the plurality of element sheets forming the stacked core with the resin and bond the element sheets to each other, thereby manufacturing the stacked core, the resin injection hole being selected so that stiffness of the entire stacked core as a cylindrical structure is ensured at a same level as in a case of injecting the resin into all the axial-direction holes.

Effect of the Invention

In the rotating electric machine and the rotating electric machine manufacturing method according to the present disclosure, resin injection is performed for, among the axial-direction holes provided in the stacked core, only necessary holes for ensuring the stiffness of the stacked core, whereby it is possible to provide a rotating electric machine and a manufacturing method therefor that enable an efficient resin injection work and can increase the stiffness of the entire stacked core with a shorter work period as compared to the conventional art.

BRIEF DESCRIPTION OF THE DRAWINGS

FIGS. 2A and 2B show a resin injection device for injecting resin into a stacked core of the rotating electric machine according to embodiment 1 and a specific part of the rotating electric machine according to embodiment 1.

FIGS. 5A and 5B schematically show a state in which resin has permeated into the gaps between the stacked core sheets through some of axial-direction holes in the stacked core shown in FIGS. 2A and 2B.

FIG. 6 schematically shows comparison of the stiffness of the stacked core when the axial-direction holes into which resin is injected are specified in the configurations shown in FIGS. 4A to 4C and FIGS. 5A and 5B.

DESCRIPTION OF EMBODIMENTS

Embodiment 1

The present disclosure relates to improvement in an injection method for filling minute gaps present between stacked layers with resin by resin injection into a stacked core used in a rotating electric machine. Hereinafter, a rotating electric machine according to embodiment 1 will be described with reference to the drawings.

First, the schematic structure of the rotating electric machine to which a resin injection device according to embodiment 1 is applied will be described with reference to FIG. 1.

Figure 1:
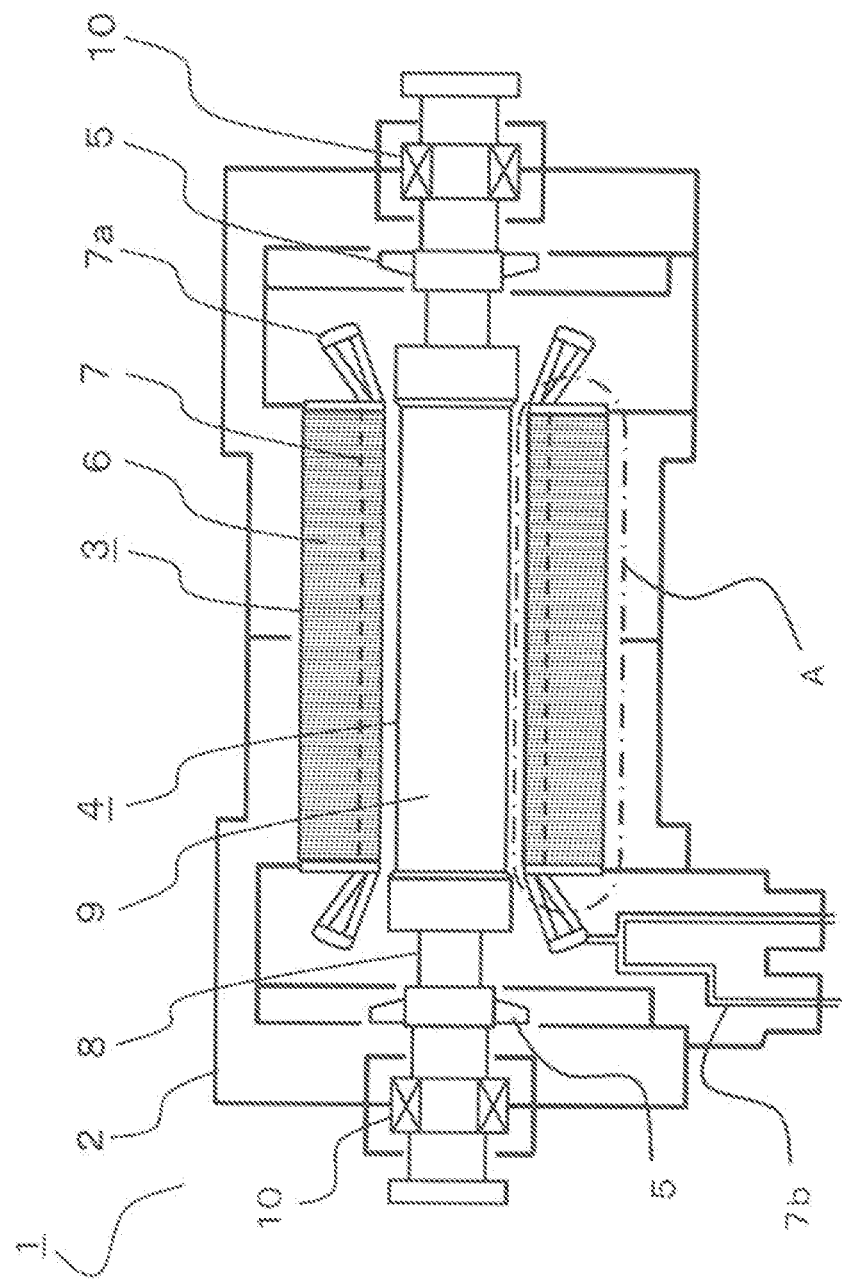
FIG. 1 is a sectional view showing the schematic structure of a rotating electric machine according to embodiment 1.

FIG. 1 shows a large-size electric generator as an example of a general rotating electric machine, and is a sectional view thereof as seen in a direction perpendicular to the axis of a rotary shaft. A rotating electric machine 1 includes a casing 2 in which cooling gas is sealed, a stator 3 provided in the casing 2, a rotor 4 provided on the inner circumferential side of the stator 3 with a predetermined gap therebetween, and a fan 5 for circulating the cooling gas in the casing. In addition, a heat exchanger (not shown) may be provided in a passage of the cooling gas.

The stator 3 includes a stator core 6 formed by a stacked core in which magnetic steel sheets (hereinafter, may be referred to as element sheets or stacked core sheets) are stacked in the axial direction, and a stator coil 7 (see a dotted-line part in the drawing) inserted into slots (not shown) formed at the inner circumferential part of the stator core 6. A main lead 7b is connected to a lower side of one (left one in the drawing) of coil ends 7a at both ends of the stator coil 7, and is led to the outside of the casing 2. Meanwhile, the rotor 4 includes a rotary shaft 8, a rotor core 9 mounted to the rotary shaft 8, and a rotor coil (not shown) inserted into slots formed in the axial direction in the rotor core 9, and both ends of the rotary shaft 8 are rotatably supported by bearings 10 attached to the casing 2.

FIGS. 2A and 2B show a resin injection device for injecting resin into the stacked core of the rotating electric machine according to embodiment 1 and a specific part of the rotating electric machine according to embodiment 1. FIG. 2A is a specific part enlarged view showing a part A enclosed by a dotted-dashed line in FIG. 1, and schematically shows a state in which the rotating electric machine according to embodiment 1 and the resin injection device for injecting resin into the stacked core of the rotating electric machine according to embodiment 1 are combined. FIG. 2B is a schematic sectional view showing a specific part of the rotating electric machine along line B-B in FIG. 2A.

In FIG. 2A, the stator core 6 is formed by a stacked core 11 in which multiple element sheets (stacked core sheets) are stacked in the axial direction (left-right direction in the drawing). Meanwhile, the resin injection device is composed of a resin injection portion 15 for injecting resin into an axial-direction hole 14 in the rotating electric machine 1, a resin discharge portion 16 for discharging unnecessary resin of the injected resin, and a resin supply portion which has a pump 20 and supplies resin to the resin injection portion 15. Hereinafter, reference characters are assigned such that the stacked core is referred to as stacked core 11 and each individual element sheet is referred to as a stacked core sheet 11a (see FIG. 2B), so as to be discriminated from each other in the description.

Here, in a case of a small-size rotating electric machine, the stacked core sheet 11a can be formed in a disk shape by stamping a plate-shaped magnetic steel sheet at one time. However, in a case of a large size, it is impossible to stamp the sheet at one time for forming the disk shape, and therefore, as shown in FIG. 2B, the plate-shaped magnetic steel sheet is stamped in a sector shape and a plurality of the sector-shaped sheets are combined in the circumferential direction to form a disk shape.

A plurality of such stacked core sheets 11a are stacked, and bolts such as through bolts 12 or core bolts 13 are inserted into through holes penetrating these stacked core sheets 11a, so as to tighten the stacked core sheets 11a in the stacking direction, thus forming the integrated stacked core 11. At this time, as the size of the stacked core 11 becomes larger, minute gaps are inevitably formed between the stacked core sheets 11a. In addition, the gaps might be enlarged through usage over time.

Further, in a case where the stacked core 11 is a particularly large size, axial-direction holes 14 for passing cooling gas therethrough are often formed in the stacked core 11. In the present disclosure, basically, using the axial-direction holes 14, the resin injection device injects resin into minute gaps between the stacked core sheets 11a, thereby increasing the stiffness of the stacked core 11 of the rotating electric machine 1.

It is noted that it can be also assumed that the axial-direction holes 14 are provided for a different purpose other than passing cooling gas, but also in this case, the rotating electric machine of embodiment 1 is applicable. In FIG. 2A, the resin injection portion 15 of the resin injection device described below is mounted to one of the axial-direction holes 14.

Figure 3A:
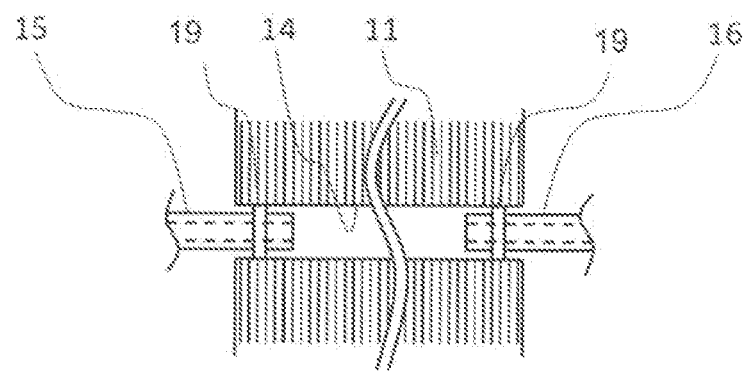
FIGS. 3A to 3C show sectional views illustrating a resin injection method for the stacked core of the rotating electric machine according to embodiment 1.
Figure 3B:
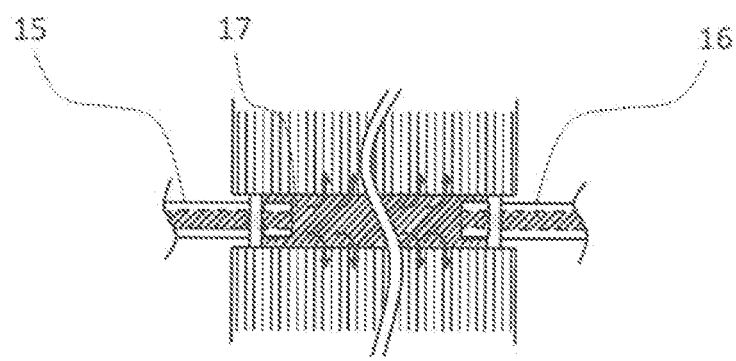
Figure 3C:
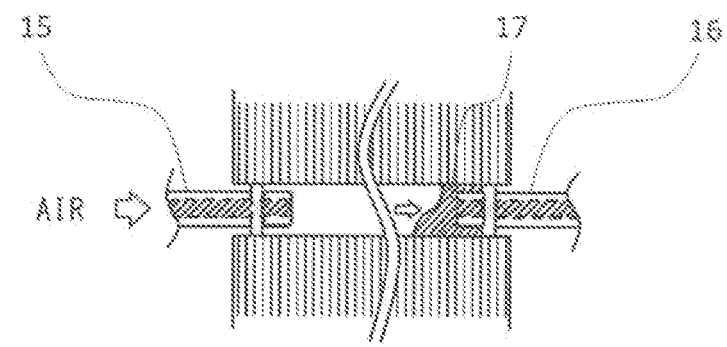

FIGS. 3A to 3C schematically show an operation process of the resin injection device for the stacked core according to embodiment 1. FIG. 3A shows a state in which the resin injection device is inserted into the stacked core but has not been fixed yet, and FIG. 3B shows a state in which the fixation is completed.

Next, a resin injection operation will be described with reference to FIGS. 3A to 3C. FIG. 3A shows a state before injection, FIG. 3B shows a state during injection, and FIG. 3C shows a process of removing resin after injection. First, the resin injection portion 15 is inserted from one end of the axial-direction hole 14 in the stacked core 11, so as to be attached to both ends of the axial-direction hole 14. At this time, as shown in FIG. 3A, elastic rings 19 are pressed in contact with the inner circumferential wall of the axial-direction hole 14, so as to seal both ends of the axial-direction hole 14.

In the drawings, the resin injection portion 15 at the right is on the resin discharge side and therefore actually serves as a resin discharge portion. However, this portion is the same as the resin injection portion 15 at the left and therefore is denoted by the same reference character in the description.

Next, as shown in FIG. 3B, to the resin injection portion 15 at the left, resin 17 is supplied from the resin supply portion (not shown) having the pump 20 and is injected into the axial-direction hole 14, so as to fill a space between the elastic rings 19 in the axial-direction hole 14. At this time, since both ends of the axial-direction hole 14 are sealed by the elastic rings 19, the filling resin 17 does not flow to the outside from the axial-direction hole 14, and after the space in the axial-direction hole 14 is filled entirely, the resin 17 permeates into gaps present between the stacked core sheets 11a of the stacked core 11 as indicated by arrows, whereby the stacked core sheets are bonded to each other.

It is noted that the resin 17 used here is desired to have low viscosity in terms of permeability into narrow gaps, and for example, epoxy resin having viscosity of about 1000 mPa·S is suitable.

Next, after injection of the resin 17 is finished through predetermined-amount resin injection and the like, as shown in FIG. 3C, instead of the resin 17, air is sent in from the resin injection portion 15 at the left. Thus, the resin 17 left inside the axial-direction hole 14 is discharged to the outside through the resin discharge portion 16 provided at the right in the drawings and a tube (not shown). An appropriate value of the pressure of the air sent in at this time is about 5 kgf/cm².

If it is difficult to fully discharge the resin 17 left inside the axial-direction hole 14 merely by injecting air, the inside of the axial-direction hole 14 may be cleaned by a cleaning brush, a piece of cloth, or the like as necessary, so as to remove the resin 17 left in the axial-direction hole 14 as appropriate.

Next, with reference to FIGS. 4A to 4C and FIGS. 5A and 5B, in cases where holes into which resin is injected are limited to some axial-direction holes provided in predetermined ranges as described below, ranges in which resin permeates into the gaps between the stacked core sheets will be described.

Figure 4A:
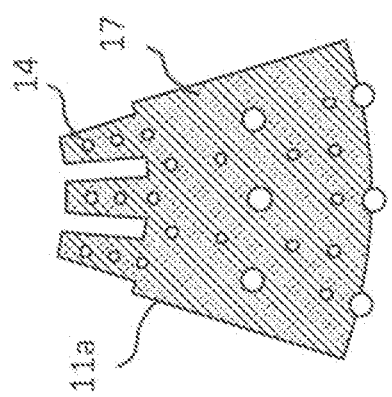
FIGS. 4A to 4C illustrate a problem in a case of causing resin to permeate into gaps between stacked core sheets through all or some of axial-direction holes in the stacked core of the rotating electric machine.

First, FIGS. 4A to 4C which are relevant to the problem described in the present disclosure will be described. FIG. 4A schematically shows the permeating range of the resin 17 when the resin 17 is injected into all the axial-direction holes 14 provided in the stacked core sheet 11a. In this drawing, specifically, an area indicated by hatching is the permeating range of the resin 17. As is obvious from the drawing, the permeating range of the resin 17 spreads over the entirety of the stacked core sheet 11a. In this case, the permeating range of the resin 17 not only spreads over the surface of the stacked core sheet 11a where the axial-direction holes 14 into which the resin 17 has been injected are present, but also connects to the resin 17 injected into the axial-direction holes 14 in the adjacent stacked core sheets 11a, in all directions, via the gaps in the stacked core.

Figure 4B:
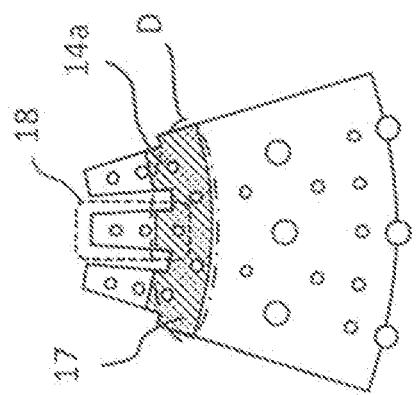

FIG. 4B schematically shows the permeating range (hatched part) when the resin 17 is injected into tooth base neighbor holes 14a provided in an area D (range enclosed by a dotted-dashed line in the drawing) near the bases of tooth portions 18 (part excluding slot areas (groove areas) from a range enclosed by a dotted line in the drawing). As is found from FIG. 4B, permeation of the resin 17 concentrates on the area D near the bases of the tooth portions 18.

Figure 4C:
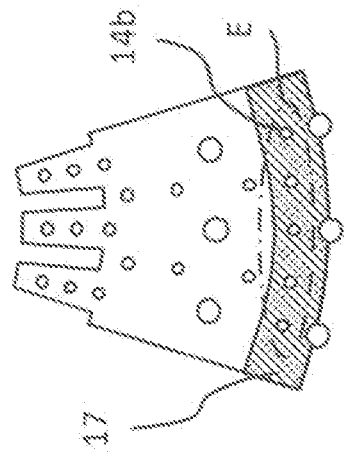

FIG. 4C schematically shows the permeating range (hatched part) when the resin 17 is injected into core outer circumferential holes 14b provided in an outer circumferential part E (range enclosed by a dotted-dashed line in the drawing) of the stacked core sheet. As is found from FIG. 4C, the permeating range of the resin 17 concentrates on the outer circumferential part E of the stacked core sheet.

Next, FIGS. 5A and 5B which are relevant to the present disclosure will be described. FIG. 5A schematically shows the permeating ranges (hatched parts) when the resin 17 is injected into the tooth base neighbor holes 14a and the core outer circumferential holes 14b. From FIG. 5A, it is found that the permeating ranges of the resin 17 concentrate on the area D near the bases of the tooth portions 18 and the outer circumferential part E of the stacked core sheet. An area in the stacked core occupied by the areas D near the bases of the tooth portions 18 is referred to as a tooth base neighboring part of the stacked core. In addition, an area in the stacked core occupied by the outer circumferential parts E is referred to as an outer circumferential part of the stacked core.

FIG. 5B schematically shows the permeating range (hatched part) of the resin 17 when the resin 17 is injected into core center holes 14c provided in a core center part F (range enclosed by a dotted-dashed line in the drawing). From FIG. 5B, it is found that the permeating range of the resin 17 concentrates on the core center part. An area in the stacked core occupied by the core center part F is referred to as a radial-direction center part of the stacked core. The radial-direction center part is, on the stacked core sheet 11a, an area centered on the position of the through bolt 12 and spreading over about 15% of the distance from the base of the tooth portion 18 to the core outer circumference in the radial direction of the stacked core 11.

Next, with reference to FIG. 6 to FIG. 9, a method for selecting the axial-direction holes into which resin is injected will be described.

FIG. 6 schematically shows comparison of the stiffness of the stacked core in cases where the axial-direction holes into which resin is injected are limited as shown in FIG. 4A to 4C and FIGS. 5A and 5B. In FIG. 6, the stiffness when resin is injected in the configuration shown in FIG. 4(A) is defined as 100%, and the stiffness values in the configurations shown in FIGS. 4B and 4C and FIGS. 5A and 5B are indicated in a unit of percentage.

The stiffness values were obtained through finite element analysis. These correspond to natural frequencies with respect to elliptic deformation of the stacked core in the cases where the permeating ranges of the resin 17 are those shown in FIGS. 4A to 4C and FIGS. 5A and 5B, and represent stiffness values of the stacked core as a cylindrical structure.

Figure 7B:
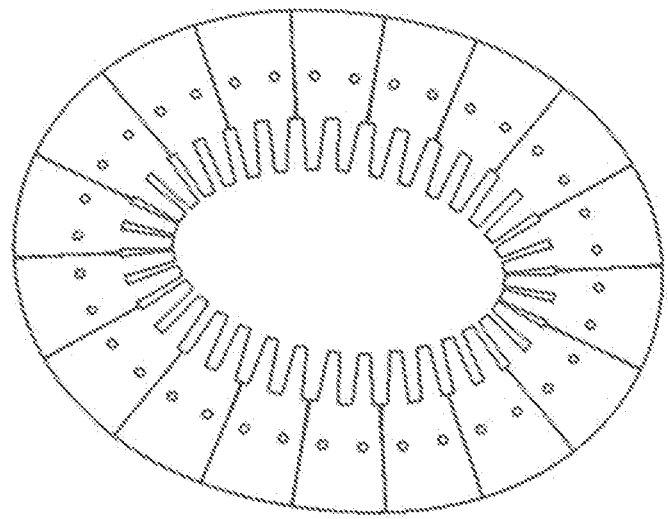
FIGS. 7A and 7B schematically illustrate vibration of the stacked core in a normal mode of elliptic deformation in a cross section thereof in the axial direction.
Figure 7A:
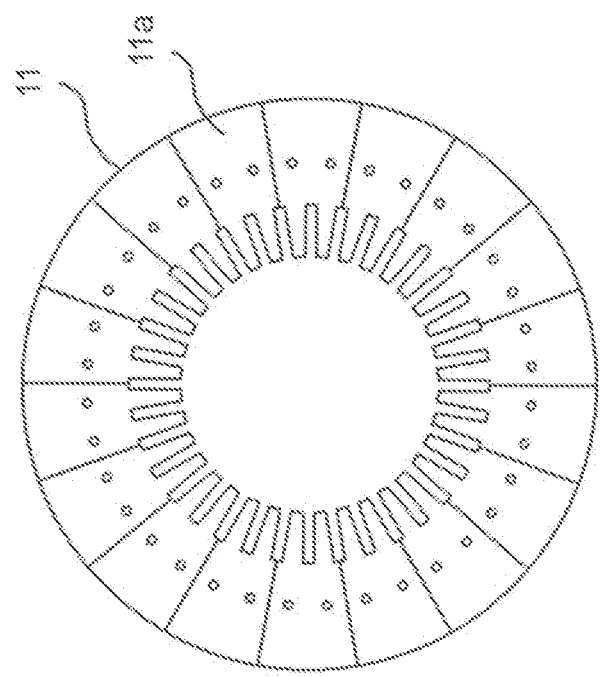

The elliptic deformation of the stacked core is shown in FIGS. 7A and 7B. FIGS. 7A and 7B schematically show sectional views in the axial direction of the stacked core when the stacked core vibrates in a normal mode of elliptic deformation. FIG. 7A shows a shape before deformation and FIG. 7B shows a shape after deformation.

Figure 8:
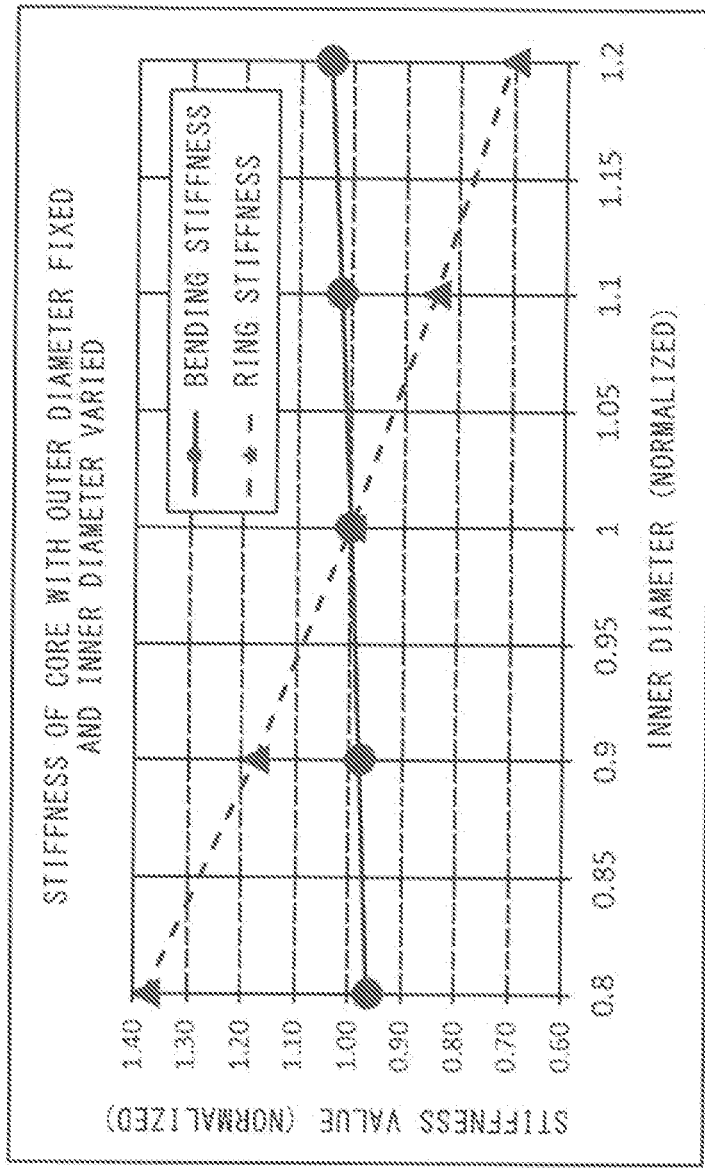
FIG. 8 shows stiffness values with respect to elliptic deformation and bending deformation, obtained through calculation while the inner diameter of the stacked core is varied.
Figure 9:
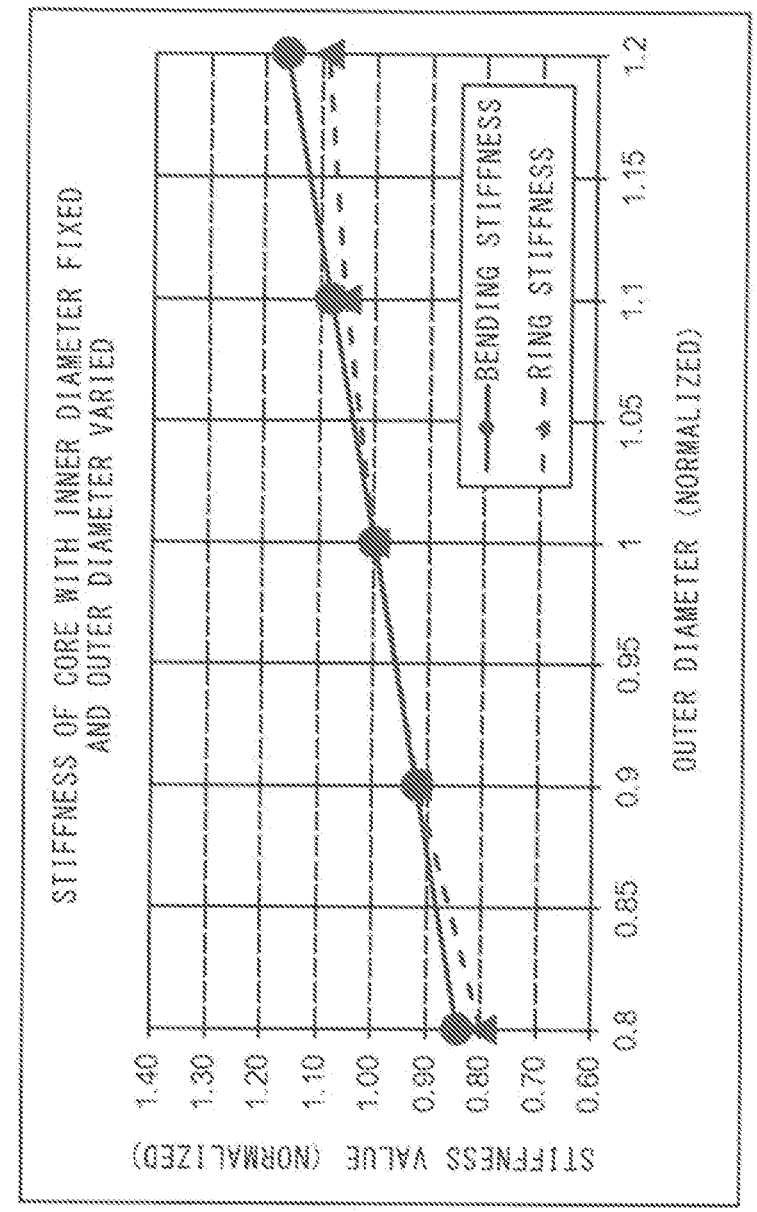
FIG. 9 shows stiffness values with respect to elliptic deformation and bending deformation, obtained through calculation when the outer diameter of the stacked core is varied.

Regarding the stiffness of the cylindrical structure, it is known that the smaller the inner diameter is, the greater the stiffness with respect to elliptic deformation of the cross section is, and the greater the outer diameter is, the greater the stiffness with respect to bending deformation in a direction perpendicular to the axial direction is. These relationships are shown in FIG. 8 and FIG. 9, for example. FIG. 8 and FIG. 9 show stiffness values (ring stiffness, bending stiffness) with respect to elliptic deformation and bending deformation, obtained through general vibration calculation when the inner diameter or the outer diameter is varied for a stacked core having a certain inner diameter, a certain outer diameter, and a certain length. FIG. 8 shows the relationship with the stiffness value of the stacked core when the inner diameter is increased/decreased with the outer diameter fixed, and it is found that the smaller the inner diameter is, the greater the ring stiffness is. Meanwhile, FIG. 9 shows the relationship with the stiffness value of the stacked core when the outer diameter is increased/decreased with the inner diameter fixed, and it is found that the greater the outer diameter is, the greater both the ring stiffness and the bending stiffness are.

In order to increase the stiffness of the stacked core as a cylindrical structure, in FIG. 5A, the axial-direction holes into which resin is injected are selected so that the gaps present between the layers on the inner circumferential side and the outer circumferential side of the stacked core are filled with resin (hereinafter, such selected axial-direction holes are referred to as resin injection holes). Thus, the stiffness value of the stacked core after resin injection becomes closest to the case of FIG. 4A. Therefore, the configuration shown in FIG. 5A may be preferentially selected in order to increase the stiffness of the stacked core.

In FIGS. 4B and 4C, resin is respectively injected into the tooth base neighbor holes 14a and the core outer circumferential holes 14b in a concentrated manner. Therefore, the configuration shown in FIG. 4B is effective for increasing the stiffness with respect to elliptic deformation, and the configuration shown in FIG. 4C is effective for increasing the stiffness with respect to bending deformation. However, the permeating range of the resin 17 after injection is limited to each of the inner circumferential side and the outer circumferential side. Therefore, in these cases, the effect of increasing the stiffness of the stacked core as a cylindrical structure is comparatively low as shown in FIG. 6. In such cases where the permeating range of the resin 17 is limited to only the inner circumferential side or the outer circumferential side as described above, the axial-direction holes are not referred to as "selected axial-direction holes".

On the other hand, in FIG. 5B, resin is injected into the core center holes 14c in a concentrated manner. Therefore, the permeating range of the resin 17 does not reach the inner circumferential side and the outer circumferential side of the stacked core, but the resin permeates over a comparatively wide range. As a result, as shown in FIG. 6, the stiffness of the stacked core after resin injection is slightly lower than that in FIG. 5A but is greater than those in FIGS. 4B and 4C. Therefore, in a case where it is difficult to inject resin into both the tooth base neighbor holes 14a and the core outer circumferential holes 14b shown in FIG. 5A, e.g., in a case where insertion of the resin injection portion 15 or the resin discharge portion 16 into the axial-direction hole 14 is hampered by the coil end 7a or the main lead 7b and thus the insertion is impossible, almost the same effect as in FIG. 5A is obtained even by injecting resin into the core center holes 14c.

From the above, it is found that using the rotating electric machine or the rotating electric machine manufacturing method according to the present disclosure to perform resin injection into the axial-direction holes in the rotating electric machine provides the effect that, even in a case where resin is injected into only limited ones of the axial-direction holes provided in the rotating electric machine without being injected into all the axial-direction holes, the stiffness of the entire stacked core as a cylindrical structure can be ensured at the same level as in a case of injecting resin into all the axial-direction holes.

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated. Specifically, although it has been assumed that the stacked core is a cylindrical structure in the above description, the stacked core is not limited thereto and the same effects are obtained even in a case of a tubular structure having an axisymmetric polygonal shape.

DESCRIPTION OF THE REFERENCE CHARACTERS 1 rotating electric machine
3 stator
4 rotor
5 fan
6 stator core
7 stator coil
7a coil end
7b main lead
8 rotary shaft
9 rotor core
10 bearing
11 stacked core
11a stacked core sheet
12 through bolt
13 core bolt
14 axial-direction hole
14a tooth base neighbor hole
14b core outer circumferential hole
14c core center hole
15 resin injection portion
16 resin discharge portion
17 resin
18 tooth portion
19 elastic ring
20 pump

The invention claimed is:

1. A rotating electric machine comprising a tubular stacked core formed by a plurality of element sheets stacked in an axial direction, wherein
   the stacked core has a plurality of axial-direction holes formed in advance,
   a surrounding area around a resin injection hole selected from the plurality of axial-direction holes is filled with resin, so that the plurality of element sheets are bonded to each other, and
   the resin injection hole is selected so that stiffness of the entire stacked core as a cylindrical structure is ensured at a same level as in a case of injecting the resin into all the axial-direction holes.

2. The rotating electric machine according to claim 1, wherein
   the resin injection hole is the axial-direction hole present in each of a tooth base neighboring part and an outer circumferential part of the stacked core.

3. The rotating electric machine according to claim 1, wherein
the resin injection hole is the axial-direction hole present in a radial-direction center part of the stacked core excluding a tooth base neighboring part and an outer circumferential part thereof.

4. A rotating electric machine manufacturing method in which resin is injected through a plurality of axial-direction holes provided in a tubular stacked core of a rotating electric machine into a gap between a plurality of element sheets forming the stacked core, so as to bond the plurality of element sheets to each other, thereby manufacturing the stacked core, wherein
from outside of the rotating electric machine, the resin is supplied by a pump to be injected from one end of a resin injection hole selected from the plurality of axial-direction holes, so as to fill the gap between the plurality of element sheets forming the stacked core with the resin and bond the plurality of element sheets to each other, thereby manufacturing the stacked core, the resin injection hole being selected so that stiffness of the entire stacked core as a cylindrical structure is ensured at a same level as in a case of injecting the resin into all the axial-direction holes.

5. The rotating electric machine manufacturing method according to claim 4, wherein
after the resin is injected from the one end of the resin injection hole and the gap between the plurality of element sheets is filled with the resin, air is supplied from the one end of the resin injection hole, to discharge the resin left in the resin injection hole.

6. The rotating electric machine manufacturing method according to claim 4, wherein
the resin injection hole is present in each of a tooth base neighboring part and an outer circumferential part of the stacked core.

7. The rotating electric machine manufacturing method according to claim 4, wherein
the resin injection hole is present in a radial-direction center part of the stacked core excluding a tooth base neighboring part and an outer circumferential part thereof.

8. The rotating electric machine manufacturing method according to claim 5, wherein
the resin injection hole is present in each of a tooth base neighboring part and an outer circumferential part of the stacked core.

9. The rotating electric machine manufacturing method according to claim 5, wherein
the resin injection hole is present in a radial-direction center part of the stacked core excluding a tooth base neighboring part and an outer circumferential part thereof.

* * * * *